(12) United States Patent
Stephan et al.

(10) Patent No.: US 11,258,770 B2
(45) Date of Patent: Feb. 22, 2022

(54) METHODS AND DEVICES FOR DELEGATION OF DISTRIBUTION OF ENCRYPTED CONTENT

(71) Applicant: ORANGE, Issy-les-Moulineaux (FR)

(72) Inventors: Emile Stephan, Chatillon (FR); Frederic Fieau, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 131 days.

(21) Appl. No.: 16/478,350

(22) PCT Filed: Jan. 16, 2018

(86) PCT No.: PCT/FR2018/050106
§ 371 (c)(1),
(2) Date: Jul. 16, 2019

(87) PCT Pub. No.: WO2018/130797
PCT Pub. Date: Jul. 19, 2018

(65) Prior Publication Data
US 2019/0372943 A1 Dec. 5, 2019

(30) Foreign Application Priority Data
Jan. 16, 2017 (FR) ...................................... 1750324

(51) Int. Cl.
*H04L 29/06* (2006.01)
*H04L 9/32* (2006.01)
(Continued)

(52) U.S. Cl.
CPC ........ *H04L 63/0428* (2013.01); *H04L 9/3263* (2013.01); *H04L 63/0823* (2013.01);
(Continued)

(58) Field of Classification Search
None
See application file for complete search history.

(56) References Cited

U.S. PATENT DOCUMENTS

| 2006/0004662 A1* | 1/2006 | Nadalin ................ H04L 9/0825 |
| | | 705/50 |
| 2015/0106624 A1 | 4/2015 | Gero et al. |
| 2018/0373887 A1* | 12/2018 | Smith ................... G06F 3/0605 |

OTHER PUBLICATIONS

International Search Report dated Mar. 19, 2018 for corresponding International Application No. PCT/FR2018/050106, filed Jan. 16, 2018.

(Continued)

*Primary Examiner* — Brandon S Hoffman
(74) *Attorney, Agent, or Firm* — David D. Brush; Westman, Champlin & Koehler, P.A.

(57) ABSTRACT

A method for requesting proof of delegation for delivery of content to a client terminal via an encrypted connection. The content is referenced on a content server, to which the client terminal emitted a request to obtain the content. The content server has delegated the delivery of the content to a primary delivery server. The method is implemented by a secondary delivery server, to which the primary delivery server has delegated the delivery of the content. The method includes: receiving a request to establish an encrypted connection, from the client terminal, including an identifier of the content server; emitting a request for proof of delegation of delivery, addressed to the content server; receiving of a message from the content server, including an encryption key; emitting a response for establishing an encrypted connection, addressed to the client terminal; and establishing the encrypted connection with the client terminal using the encryption key.

11 Claims, 2 Drawing Sheets

Figure 1:
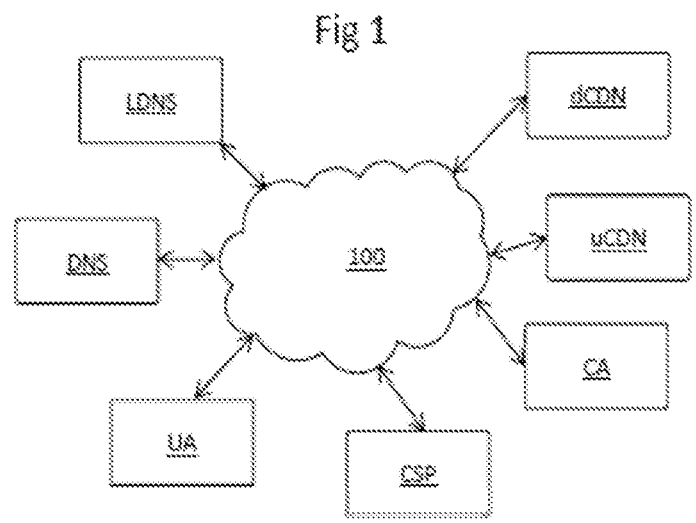

(51) Int. Cl.
  *H04L 67/01* (2022.01)
  *H04L 69/326* (2022.01)
(52) U.S. Cl.
  CPC ............ *H04L 63/166* (2013.01); *H04L 67/42* (2013.01); *H04L 69/326* (2013.01)

(56) References Cited

OTHER PUBLICATIONS

Liang Jinjin et al., "When HTTPS Meets CDN: A Case of Authentication in Delegated Service", 2014 IEEE Symposium on Security and Privacy, IEEE, May 18, 2014 (May 18, 2014), pp. 67-82, XP032686141.

Sollins K. R., "Cascaded Authentication", Security and Privacy, 1988. Proceedings., 1988 IEEE Symposium on Oakland, CA, USA 18-21 Apr. 1, Washington, DC, USA, IEEE Comput. Soc. Pre. US, Apr. 18, 1988 (Apr. 18, 1988), pp. 156-163, XP010012310.

Written Opinion of the International Searching Authority dated Mar. 19, 2018 for corresponding International Application No. PCT/FR2018/050106, filed Jan. 16, 2018.

R. Barnes et al., "Automatic Certificate Management Environment (ACME) draft-ietf-acme-acme-04", Network Working Group, Internet Draft, Oct. 31, 2016.

J. Reschke et al., "'Out-Of-Band' Content Coding for HTTP draft-reschke-http-oob-encoding-08", Network Working Group, Internet Draft, Sep. 26, 2016.

T. Dierks et al., "The Transport Layer Security (TLS) Protocol Version 1.2", Request for Comments: 5246, Aug. 2008.

J. Hodges et al., "HTTP Strict Transport Security (HSTS)", Request for Comments: 6797, Nov. 2012.

M. Nottingham et al., "HTTP Alternative Services" Request for Comments: 7838, Apr. 2016.

F. Le Faucheur, Ed. et al., "Content Distribution Network Interconnection (CDNI) Logging Interface", Request for Comments: 7937, Aug. 2016.

B. Niven-Jenkins et al., "Content Delivery Network Interconnection (CDNI) Metadata", Request for Comments: 8006, Dec. 2016.

J. Seedorf et al., "Content Delivery Network Interconnection (CDNI) Request Routing: Footprint and Capabilities Semantics", Request for Comments: 8008, Dec. 2016.

\* cited by examiner

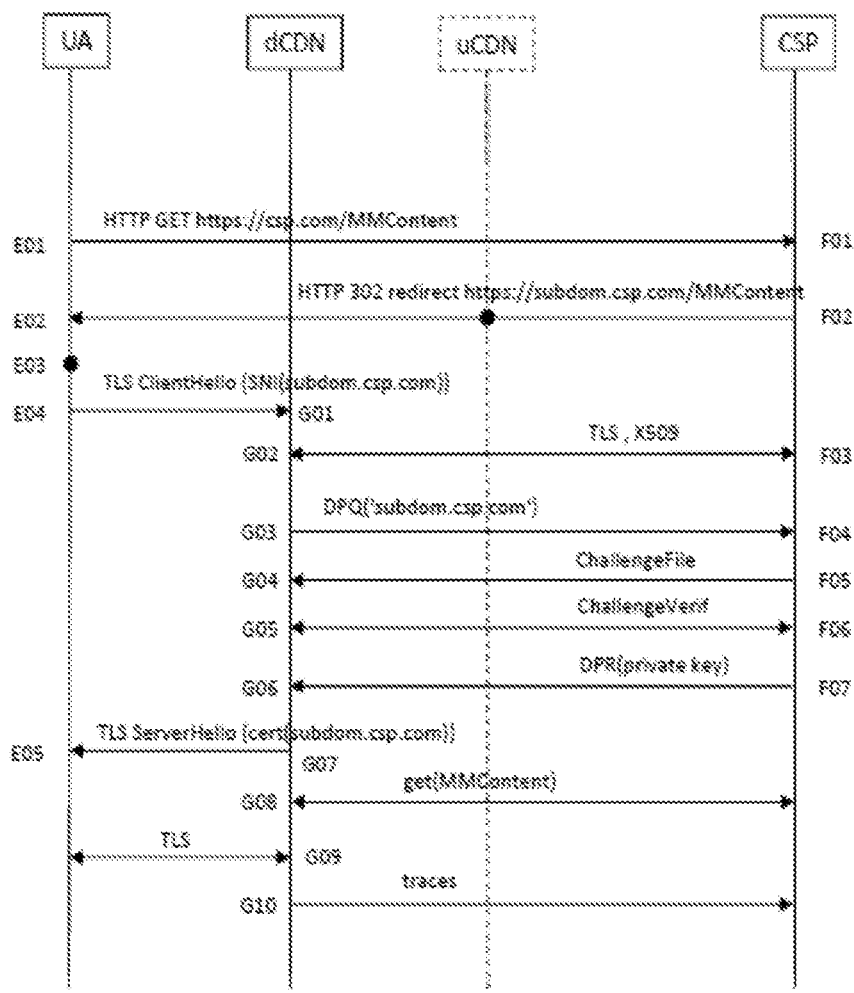

METHODS AND DEVICES FOR DELEGATION OF DISTRIBUTION OF ENCRYPTED CONTENT

CROSS-REFERENCE TO RELATED APPLICATIONS

This Application is a Section 371 National Stage Application of International Application No. PCT/FR2018/050106, filed Jan. 16, 2018, which is incorporated by reference in its entirety and published as WO 2018/130797 A1 on Jul. 19, 2018, not in English.

1. FIELD OF THE INVENTION

The patent application lies in the field of contents distribution networks, and more particularly in respect of encrypted contents.

2. PRIOR ART

An ever larger share of Internet traffic is being transported over the TLS (Transport Layer Security) protocol, a protocol standardized by the IETF in RFC 5246 and making it possible to secure the exchanges between a client and a server.

TLS makes it possible to authenticate the server or the client, to encrypt the content of the exchanges between them and to verify the integrity thereof.

When a user wishes to consume a content on the Internet with his client terminal, for example by way of an application such as a browser (also called a "user agent"), a query is sent to a server of a content provider. Usually, this content provider delegates the delivery of the content to a so-called "cache" server, chosen as a function of several criteria, such as for example the location of the client's terminal and the terms of the contract between the content provider and the operator of the other server, when this contract exists. The initial query is redirected by the server of the content provider to the cache server in a manner which is transparent to the client terminal. This can be done with the aid of an https redirection since such a redirection enables the cache server to deliver the content while displaying the domain name of the content provider, while using the cryptographic hardware associated with the identity of the content provider. This cryptographic hardware may comprise inter alia a public key and a private key.

When this cache server, also called first delegated server, itself delegates the operation of delivering the content to a second server, termed the second delegated server, the continuity of security is interrupted. The client terminal, requesting the content from the content provider's server, is directly or indirectly redirected to the second delegated server, the latter cannot satisfy the query since it does not possess the appropriate cryptographic hardware.

One of the aims of the invention is to remedy these drawbacks of the prior art.

3. DISCLOSURE OF THE INVENTION

The invention improves the situation with the aid of a method for requesting proof of delegation for the delivery of a content to a client terminal through an encrypted connection, the content being referenced on a server termed the content server, to which the client terminal has sent a query to obtain the content, the content server having delegated the delivery of said content to a server termed the primary delivery server, the method being implemented by a delivery server termed the secondary delivery server, to which the primary delivery server has delegated the delivery of said content, and comprising the following steps:

reception of a request in respect of establishment of an encrypted connection, originating from the client terminal, comprising an identifier of the content server, sending of a request for proof of delegation of delivery, destined for the content server, reception of a message originating from the content server, comprising an encryption key, sending of a response in respect of establishment of an encrypted connection, destined for the client terminal, establishment of the encrypted connection with the client terminal with the aid of the encryption key.

According to the prior art, a terminal asking a content server for a content, if it is redirected to a secondary delivery server not having any prior relation with the content server, the connection for the actual delivery of the content cannot be encrypted in a manner which is certified by the content server.

By virtue of the method for requesting proof of delegation, the secondary server obtains the cryptographic hardware necessary for the establishment of the encrypted connection. The connection is perceived by the terminal as if it were established with a server of the same domain as the content server, since the encryption is performed with the aid of a key obtained from the content server, which is the same as the key that the terminal necessarily obtained when it sent its initial query to the content server.

According to one aspect of the invention, the method for requesting proof of delegation further comprises the following steps:

obtaining of the content from the content server, delivery of the content to the client terminal through the encrypted connection.

The secondary server obtains the content from the content server as if it were the primary server, and the delivery of the content can be done through the encrypted connection by the secondary delivery server.

According to one aspect of the invention, the method for requesting proof of delegation comprises the following steps, prior to the step of receiving the message comprising the encryption key:

reception of at least one instruction relating to a capability to deliver the content, originating from the content server, execution of the instruction.

Advantageously, the content server can test the capabilities of the secondary delivery server, by sending it a "challenge file" comprising specific instructions, corresponding to the "service data". The service data comprise one or more instructions intended to enable delivery of the content.

According to one aspect of the invention, the certification request comprises an item of information relating to the delivery capabilities of the secondary delivery server.

By virtue of this aspect, the secondary server enables the content server to determine whether the secondary server can deliver the content requested in a satisfactory manner. The secondary server may have previously obtained the same type of item of information from the primary server, thus enabling it to adapt the item of information to the expectations of the content server.

The invention also relates to a method of delegation for the delivery of a content to a client terminal through an encrypted connection, the content being referenced on a server termed the content server to which the client terminal has sent a query to obtain the content, the content server having delegated the delivery of said content to a server termed the primary delivery server, the primary delivery server having delegated the delivery of said content to a server termed the secondary delivery server, the method being implemented by the content server, and comprising the following steps:

reception of a request for proof of delegation, originating from the secondary delivery server, analysis of the request, as a function of the result of the analysis, sending of a response comprising an encryption key associated with the content server.

By virtue of the method of delegation, if the terminal is redirected to a secondary delivery server not having any prior relation with the content server, the delivery of the content can be done through a connection which is encrypted with the aid of the key obtained, since it is the same as the terminal necessarily obtained when it sent its initial query to the content server.

According to one aspect of the invention, the analysis step comprises the following steps:

sending of at least one instruction relating to a capability to deliver the content, destined for the secondary delivery server, verification of the execution of the instruction.

Advantageously, the content server profits from a possibility given by the CSR protocol, which is to test the capabilities of the requesting server, in this instance the capabilities of the secondary delivery server, by sending it a "challenge file" comprising specific instructions. Moreover, this challenge file comprises one or more instructions intended to test the capability of the secondary server to deliver the content.

According to one aspect of the invention, the response is not sent if the execution of the instruction is not verified after expiry of a duration determined by the content server.

Advantageously, the content server does not send the proof of delegation requested to the secondary server if it is not capable of delivering the content in a satisfactory manner. Consequently, the content server interrupts the communication with the secondary server which will not be able to deliver the content to the terminal.

According to one aspect of the invention, the response is sent with a false key if the execution of the instruction is not verified after expiry of a duration determined by the content server, or if the secondary delivery server is not authenticated by a certifying authority.

If the secondary delivery server is not capable of executing an instruction required for proper delivery of the content, or if it has not identified itself to the content server with the aid of a certificate emanating from a recognized authority, it is probable that it is not legitimate or not configured to deliver the content to the terminal. However, the content server reacts as if the secondary delivery server's request was legitimate. Thus, the connection with the secondary server is maintained for a fairly long time, thus making it possible for example to locate this server on the basis of its IP address, and to instigate possible action aimed at neutralizing or reconfiguring the secondary server.

According to one aspect of the invention, the request for proof of delegation is a message of Certificate Signing Request type.

According to the prior art, a CSR (Certificate Signing Request) query can only be received by a widely recognized trusted third-party, called a certifying authority, making it possible to authenticate the identity of the applicant. Such a certifying authority is used for example to secure digital communications via the TLS protocol.

Advantageously, the same query format is used between two servers, that is to say between the secondary delivery server and the content server. Thus, the invention can be executed with a minimum of modification of an existing protocol.

The invention further relates to a device for requesting proof of delegation for the delivery of a content to a client terminal through an encrypted connection, the content being referenced on a server termed the content server, to which the client terminal has sent a query to obtain the content, the content server having delegated the delivery of said content to a server termed the primary delivery server, the primary delivery server having delegated the delivery of said content to a delivery server termed the secondary delivery server, the device comprising a reprogrammable computing machine or a dedicated computing machine, able to and configured to:

receive a request in respect of establishment of an encrypted connection, originating from the client terminal, comprising an identifier of the content server, send a request for proof of delegation of delivery, destined for the content server, receive a message originating from the content server, comprising an encryption key, send a response in respect of establishment of an encrypted connection, destined for the client terminal, establish the encrypted connection with the client terminal with the aid of the encryption key.

This device for requesting proof of delegation, able to implement in all its embodiments the method for requesting proof of delegation which has just been described, is intended to be implemented in a content broadcasting server.

The invention also relates to a device for delegation for the delivery of a content to a client terminal through an encrypted connection, the content being referenced on a server termed the content server to which the client terminal has sent a query to obtain the content, the content server having delegated the delivery of said content to a server termed the primary delivery server, the primary delivery server having delegated the delivery of said content to a server termed the secondary delivery server, the device comprising a reprogrammable computing machine or a dedicated computing machine, able to and configured to:

receive a request for proof of delegation, originating from the secondary delivery server, analyze the request, as a function of the result of the analysis, send a response comprising an encryption key associated with the content server.

This delegation device, able to implement in all its embodiments the method of delegation which has just been described, is intended to be implemented in a content referencing server.

The invention also relates to a system for delegating broadcasting of encrypted contents, comprising a content server, a primary delivery server, a secondary delivery server, and a client terminal, the content server comprising a delegation device such as that which has just been described, the secondary delivery server comprising a device for requesting proof of delegation such as that which has just been described.

The invention envisages finally:

a computer program comprising instructions for the implementation of the steps of the method for requesting proof of delegation which has just been described, when this program is executed by a processor, as well as an information medium readable by a content broadcasting server, and comprising instructions of this computer program, a computer program comprising instructions for the implementation of the steps of the method of delegation which has just been described, when this program is executed by a processor, as well as an information medium readable by a content referencing server, and comprising instructions of this computer program.

These programs can use any programming language, and be in the form of source code, object code, or of code intermediate between source code and object code, such as in a partially compiled form, or in any other desirable form.

The information media can be any entity or device capable of storing the program. For example, such a medium can comprise a storage means, such as a ROM, for example a CD ROM or a microelectronic circuit ROM, or else a magnetic recording means, for example a diskette (floppy disk) or a hard disk.

Moreover, such an information medium can be a transmissible medium such as an electrical or optical signal, which can be conveyed via an electrical or optical cable, by radio or by other means. A program according to the invention can be in particular downloaded over a network of Internet type. Alternatively, an information medium according to the invention can be an integrated circuit in which the program is incorporated, the circuit being adapted to execute or to be used in the execution of the methods in question.

4. PRESENTATION OF THE FIGURES

Figure 3:
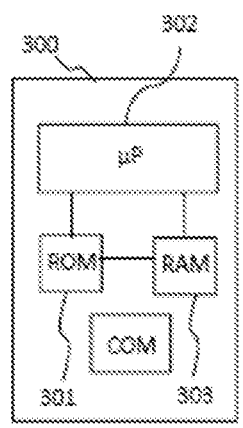
Figure 4:
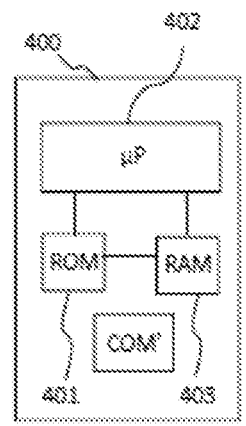

Other advantages and characteristics of the invention will become more clearly apparent on reading the following description of a particular embodiment of the invention, given by way of simple illustrative and nonlimiting example, and of the appended drawings, among which:

FIG. 1 illustrates a network configuration situating the entities involved in the technique described, FIG. 2 presents an example of stringing together and implementing the steps of the method for requesting proof of delegation and of the method of delegation, according to one aspect of the invention, FIG. 3 presents an exemplary structure of a device for requesting proof of delegation, according to one aspect of the invention, FIG. 4 presents an exemplary structure of a delegation device, according to one aspect of the invention.

5. DETAILED DESCRIPTION OF AT LEAST ONE EMBODIMENT OF THE INVENTION

In the subsequent description, examples are presented of several embodiments of the invention based on the TLS and https protocols, but the invention may be based on other protocols, such as for example the HTTP1.1, SPDY, HTTP2, SCTP, DTLS, COAP and QUIC protocols.

A network configuration situating the entities involved in the technique described is now described in conjunction with FIG. 1. More particularly, the following entities are illustrated:

a server CSP of a content provider referencing various contents (for example multimedia content, of the type comprising sounds, images or videos, or executable files) intended to be distributed to client terminals of end users;

a client terminal UA, for example a computer, a smartphone of a user, seeking to obtain a content from the content provider, such a client terminal UA being able to embed onboard one or more client agents (or "User Agents") of the http (for "HyperText Transfer Protocol") or HTTPS (for "HyperText Transfer Protocol Secure") type or else of the Internet browser type;

a content delivery server uCDN to which the server CSP of the content provider has delegated the delivery of the content in question and which is known to the server CSP of the content provider with the aid of a domain name;

a content delivery secondary dCDN to which the content delivery primary uCDN has potentially delegated the delivery of the content sought by the user of the client terminal UA in a dual-delegation context;

a domain name resolution server DNS making it possible to associate a domain name with a network address;

a server CA of a certifying authority making it possible to deliver certificates, for example according to the HTTPS (for "HyperText Transfer Protocol Secure") protocol, to the servers in question.

The various entities presented hereinabove are then connected together via a telecommunications network 100, for example based on an Internet protocol, for the transmission of data.

In certain embodiments, a local domain name resolution server LDNS calls upon a central server DNS.

In certain embodiments, several servers CA of certifying authorities are used, each server being able to call upon a different server CA.

In other embodiments, the delivery servers uCDN and dCDN may be grouped together in one and the same hardware entity.

In yet other embodiments, further delivery servers are present, for example in a context of cascaded delegations.

FIG. 2 presents an example of stringing together and implementing the steps of the method for requesting proof of delegation and of the method of delegation, according to one aspect of the invention.

A user of a terminal UA wishes to consume a multimedia content MMContent, referenced by a content provider, whose identity he knows or has obtained in any way.

In an initial phase, not illustrated, for example with the aid of a search engine and a search on the basis of a name of the content or on the basis of the name of the content provider, the terminal UA obtains the domain name of a server CSP associated with the content provider, on which the content MMContent is referenced. This address is for example in the form of a url (Uniform Resource Locator), such as 'csp.com'.

During a step E01, known, with the aid of a specific application or of a generic browser, the terminal UA sends a query to obtain the content MMContent. For the sake of simplicity the term "terminal" is used in this document, but this term represents such an application or browser installed on the terminal.

This query to obtain the content is for example an http query using the https protocol, such as:

"http GET https://csp.com/MMContent"

This query triggers a procedure for establishing a secure TLS tunnel between the terminal UA and the server CSP. This procedure comprises the sending of a ClientHello TLS message by the UA. In response, the server CSP sends to the terminal UA a ServerHello message comprising cryptographic hardware such as for example a public key with which is associated a private key kept by the administrator of the CSP domain. This pair of keys is in general attached to a certificate of a domain name of the server CSP, which the server CSP obtained from any certifying authority. This cryptographic hardware will enable the terminal UA to subsequently decrypt content encrypted by the server CSP or by another server of the same domain "csp.com" or of a sub-domain.

It may also happen that during step E01 the query to obtain the content is a non-secure http query "GET http://csp.com/MMContent", and that the response of the server CSP includes a field such as that described in RFC7838 (example: Alt-Svc: h2=":443"; ma=3600), proposing the use of a secure connection or else a field STS described in RFC6797 imposing the use of HTTPS for the exchanges.

During a step F01, known, the server CSP receives the http query GET and identifies a primary delivery server uCDN, with which a relation of a contractual nature exists and to which the content server CSP has delegated the delivery of the content MMContent. This server uCDN is selected by the server CSP according to diverse criteria, such as for example proximity in terms of network with the terminal UA, or a user profile of the terminal UA.

In the context of the invention, it is not the server uCDN which performs the delivery of the content in question, but a secondary delivery server dCDN, delegated by the server uCDN.

During a step F02, known, the terminal UA is redirected to the server dCDN. Several known schemes, based on HTTP and DNS compulsory redirections, or on alternate redirections, or on a combination of the two, have as final result that the terminal UA has at its disposal an IP address of the server dCDN, and a url address to the content. The redirection message sent during step F02 is then, for example:

"http 302 redirect https://subdom.CSP.com/MMContent", which the terminal UA receives during step E02.

During a step E03, the terminal UA obtains the IP address of the server dCDN, for example by a DNS query on the domain name "subdomsubdom.CSP.com" where "subdom.csp.com" is for example the name of the sub-domain of the domain "csp.com" that the content provider uses for the content MMContent.

It may also happen that one of the servers involved in the redirection, for example the server CSP, inserts a list of several server addresses into an alternate redirection message sent during step F02. In this case, during step E03, the terminal UA obtains the IP address of the server dCDN after having performed a selection from among the server addresses included in the response, on criteria such as for example the proximity between the terminal UA and the servers of the list, the list being for example included in a response of out-of-band encoding type such as described in the document "https://tools.ietf.org/html/draft-reschke-http-oob-encoding-08.txt".

In all the cases presented hereinabove, at the end of step E03 the terminal UA has at its disposal a url to the domain "'subdom.CSP.com" and the IP address of a server of the domain "dCDN.com", called server dCDN.

When the terminal UA has obtained the IP address of the server dCDN, it requests, during a step E04, the establishment of an encrypted session between itself and the server dCDN. This entails for example a secure TLS tunnel between the terminal UA and the server dCDN. This procedure comprises the sending of a ClientHello TLS message by the terminal UA. Accordingly, a message such as for example:

"TLS ClientHello (SNI=subdom.csp.com)"

is sent by the terminal UA, and is received by the server dCDN during a step G01.

The server dCDN detects that it does not have at its disposal the cryptographic hardware for the domain "subdom.csp.com".

During a step G02, the server dCDN connects to the server CSP via a secure connection of TLS type where the two entities authenticate one another mutually for example by exchanging certificates X.509.

During a step F03, the server CSP receives from the server dCDN the message sent during step G02. It should be noted that the server receiving this message may be a server of the domain "csp.com" different from the one that received during step F01 the content query on the part of the terminal UA. For simplicity, if they are distinct, these two servers which are of the same domain "csp.com" are both called "server CSP".

During a step G03, the server dCDN sends the server CSP a request for proof of delegation of delivery of content, the request comprising an identifier of the server CSP such as "subdom.csp.com". According to the invention, this request is addressed to the content server CSP, which acts in relation to the server dCDN as if it were a certifying authority for its own domain. The request for proof of delegation of delivery, named DelegationProofQuery in the method, takes for example the form of a CSR (Certificate Signing Request) query.

In the prior art, a CSR query is a request, addressed to a certifying authority, for a certificate. According to the invention, a DelegationProofQuery moreover comprises the description of the content delivery capabilities of dCDN in the manner of those described in RFC8008 "Content Delivery Network Interconnection (CDNI) Request Routing: Footprint and Capabilities Semantics". Moreover a DelegatedCertificateQuery is signed with the private key of "dcdn.com" and not with the public key of the certificate requested as in the case of a CSR query according to the prior art.

Optionally, dCDN can also include in the query DelegationProofQuery data previously received from the server uCDN, such as a signature enabling the content server CSP to identify the server uCDN and to deduce therefrom the existence of a link between the servers uCDN and dCDN. With this signature may be associated an item of information relating to capabilities of the server uCDN, of a technical nature or relating to a geographical coverage of delivery of the server uCDN, possibly in a manner adapted to the capabilities of the server dCDN.

During a step F04, the content server CSP receives the query DelegationProofQuery. Next, the server CSP prepares the cryptographic hardware for delegation (private and public keys, certificate for the domain "subdom.csp.com", duration of validity) as well as the technical specifications necessary for the delivery of the content within the framework of a delegation to the server dCDN, called "service data". These service data are adapted to the capabilities described by dCDN in the query DelegationProofQuery. The service data comprise for example:

the certificate for the domain "subdom.csp.com", for example the corresponding certificate X.509, including the public encryption key (the private key is sent later during step F07), instructions enabling dCDN to go and acquire the content from the server CSP, instructions for the delivery of the content by the server dCDN (format, bitrate, encoding of the data forming the content, such as are described in RFC8006 "Content Delivery Network Interconnection (CDNI) Metadata"), instructions for the record of the delivery traces (start, end, volume, errors, such as are described in RFC 7937 "Content Distribution Network Interconnection (CDNI) Logging Interface").

During this step F04, if the query comprises a signature of the server uCDN, the content server CSP may also store the query so as to enable possible remuneration of the operator of the server uCDN, related to the delivery of the content.

During a step F05, the content server CSP prepares and sends destined for the server dCDN a test in the form of a file termed a "challenge file", which the server that receives it must install at a determined location, such as provided for by the ACME (Automatic Certificate Management Environment, "draft-ietf-acme-acme-04") protocol for example. Advantageously according to the invention, this test file comprises the service data prepared during step F04, encrypted with the aid of the private key of the certificate of the domain "subdom.csp.com".

During a step G04, the server dCDN receives the challenge file, and installs it during a step G05 at the advocated location. It should be noted that at this juncture, the server dCDN cannot decrypt this challenge file since it does not possess the necessary key.

During a step F06, after expiry of a determined lag, the server CSP verifies that the challenge file is properly installed in the server dCDN at the advocated location, and that it is identical to the challenge file sent during step F05, such as provided for by the ACME protocol.

During a step F07, if the challenge file is accessible and compliant, the server CSP sends the server dCDN a message comprising the private encryption key related to the certificate of the domain "subdom.csp.com". Preferably, this certificate is temporary, and its duration of validity of the order of a few hours to a day.

Optionally, if the verification step F06 fails, or if, right from step F03, the server CSP detects an uncertainty as to the authenticity of the server dCDN, the server CSP inserts an erroneous key into message. This presents the advantage of keeping the connection between the servers CSP and dCDN active for as long as possible, and of giving the server CSP more chance of keeping the IP address of the server dCDN active, so as to locate a possibly fraudulent or poorly configured server.

During a step G06, the server dCDN receives the message comprising the private key of the certificate for the domain "subdom.csp.com". The server decrypts the challenge file comprising the service data, with the aid of the private key.

During a step G07, the server dCDN responds to the request in respect of establishment of an encrypted session sent by client terminal UA during step E04, with the certificate of the domain "subdom.csp.com". Accordingly, one or more messages such as for example:

"TLS ServerHello (cert (subdom.scp.com))"

is sent by the server dCDN, and is received by the terminal UA during a step E05. The TLS connection requested by the terminal UA can then be established, since the certificate sent by the server dCDN corresponds to that of the domain "subdom.csp.com", except if during step F07 the server CSP has sent the server dCDN an erroneous key.

During a step G08 which may be executed before, after or in parallel with step G07, the server dCDN takes into account the service data so as to obtain from the server CSP the content to be delivered.

During a step G09, the server dCDN transmits the content to the terminal UA. For the client terminal UA, everything happened in a transparent manner, as if the server dCDN were officially delegated by the provider of the content to deliver it to the terminal.

During an optional step G10, the server dCDN sends the record of the delivery traces to the server CSP, for accounting purposes.

FIG. 3 presents an exemplary structure of a device for requesting proof of delegation 300, enabling the implementation of a method for requesting proof of delegation according to any one of the embodiments described hereinabove in conjunction with FIG. 2.

The device for requesting proof of delegation 300 comprises a random-access memory 303 (for example a RAM memory), a processing unit 302, equipped for example with a processor, and driven by a computer program stored in a read-only memory 301 (for example a ROM memory or a hard disk). On initialization, the code instructions of the computer program are for example loaded into the random-access memory 303 before being executed by the processor of the processing unit 302.

FIG. 3 illustrates just one particular embodiment, from among several possible particular embodiments, of the method for requesting proof of delegation detailed hereinabove, in conjunction with FIG. 2. Indeed, the technique of the invention is carried out interchangeably on a reprogrammable computing machine (a computer PC, a processor DSP or a microcontroller) executing a program comprising a sequence of instructions, or on a dedicated computing machine (for example a set of logic gates such as an FPGA or an ASIC, or any other hardware module).

In the case where the invention is implanted on a reprogrammable computing machine, the corresponding program (that is to say the sequence of instructions) will be able to be stored in a removable or irremovable storage medium, this storage medium being partially or totally readable by a computer or a processor.

The device for requesting proof of delegation also comprises a communication module (COM) adapted to send a request for proof of delegation of delivery, a response in respect of establishment of an encrypted connection, and to receive a request in respect of establishment of an encrypted connection, a message comprising an encryption key, and an instruction relating to a capability to deliver the content.

According to one embodiment, such a device for requesting proof of delegation is included in a content broadcasting server, for example a cache server able to broadcast the content.

FIG. 4 presents an exemplary structure of a delegation device 400, enabling the implementation of a method of delegation according to any one of the embodiments described hereinabove in conjunction with FIG. 2.

The delegation device 400 comprises a random-access memory 403 (for example a RAM memory), a processing unit 402, equipped for example with a processor, and driven by a computer program stored in a read-only memory 401 (for example a ROM memory or a hard disk). On initialization, the code instructions of the computer program are for example loaded into the random-access memory 403 before being executed by the processor of the processing unit 402.

FIG. 4 illustrates just one particular way, out of several possible ways, of implementing the method of delegation detailed hereinabove, in conjunction with FIG. 2. Indeed, the technique of the invention is carried out interchangeably on a reprogrammable computing machine (a computer PC, a processor DSP or a microcontroller) executing a program comprising a sequence of instructions, or on a dedicated computing machine (for example a set of logic gates such as an FPGA or an ASIC, or any other hardware module).

In the case where the invention is implanted on a reprogrammable computing machine, the corresponding program (that is to say the sequence of instructions) will be able to be stored in a removable or irremovable storage medium, this storage medium being partially or totally readable by a computer or a processor.

The delegation device also comprises a communication module (COM') adapted to receive a request for proof of delegation, and to send a response comprising an encryption key, and an instruction relating to a capability to deliver the content.

In one embodiment, such a delegation device is included in a server, for example a server of a content provider able to reference said content.

The invention claimed is:

1. A method for requesting proof of delegation for delivery of a content to a client terminal through an encrypted connection, the content being referenced on a content server, to which the client terminal has sent a query to obtain the content, the content server having delegated the delivery of said content to a primary delivery server, the method being implemented by a secondary delivery server, to which the primary delivery server has delegated the delivery of said content, and comprising the following acts:
   receiving a request in respect of establishment of the encrypted connection, originating from the client terminal, comprising an identifier of the content server,
   sending a request for proof of delegation of delivery, destined for the content server, comprising a signature of the primary delivery server,
   receiving a message originating from the content server, comprising an encryption key,
   sending a response in respect of establishment of the encrypted connection, destined for the client terminal, and
   establishing the encrypted connection with the client terminal with the aid of the encryption key.

2. The method as claimed in claim 1, further comprising:
   obtaining the content from the content server, and
   delivering the content to the client terminal through the encrypted connection.

3. The method as claimed in claim 1, comprising the following acts, prior to the act of receiving the message comprising the encryption key:
   receiving at least one instruction relating to a capability to deliver the content, originating from the content server,
   executing the instruction.

4. The method as claimed in claim 1, where the request for proof of delegation of delivery comprises an item of information relating to the delivery capabilities of the secondary delivery server.

5. A method of delegation for delivery of a content to a client terminal through an encrypted connection, the content being referenced on a content server to which the client terminal has sent a query to obtain the content, the content server having delegated the delivery of said content to a primary delivery server, the primary delivery server having delegated the delivery of said content to a secondary delivery server, the method being implemented by the content server, and comprising the following acts:
   receiving a request for proof of delegation, originating from the secondary delivery server and comprising a signature of the primary delivery server,
   and
   if the signature enables the content server to identify the primary delivery server sending a response to the secondary delivery server, comprising an encryption key associated with the content server.

6. The method as claimed in claim 5, further comprising:
   sending at least one instruction relating to a capability to deliver the content, destined for the secondary delivery server,
   verifying execution of the instruction.

7. The method as claimed in claim 6, where the response is not sent if the execution of the instruction is not verified after expiry of a duration determined by the content server.

8. The method as claimed in claim 6, where the response is sent with a false key if the execution of the instruction is not verified after expiry of a duration determined by the content server, or if the secondary delivery server is not authenticated by a certifying authority.

9. The method as claimed in claim 5, where the request for proof of delegation is a message of a Certificate Signing Request type.

10. A device for requesting proof of delegation for delivery of a content to a client terminal through an encrypted connection, the content being referenced on a content server, to which the client terminal has sent a query to obtain the content, the content server having delegated the delivery of said content to a primary delivery server, the primary delivery server having delegated the delivery of said content to a secondary delivery server, the device comprising:
   a reprogrammable computing machine or a dedicated computing machine, able to and configured to:
   receive a request in respect of establishment of the encrypted connection, originating from the client terminal, comprising an identifier of the content server,
   send a request for proof of delegation of delivery, destined for the content server, comprising a signature of the primary delivery server,
   receive a message originating from the content server, comprising an encryption key,
   send a response in respect of establishment of the encrypted connection, destined for the client terminal, and
   establish the encrypted connection with the client terminal with the aid of the encryption key.

11. A device for delegation for delivery of a content to a client terminal through an encrypted connection, the content being referenced on a content server to which the client terminal has sent a query to obtain the content, the content server having delegated the delivery of said content to a primary delivery server, the primary delivery server having delegated the delivery of said content to a secondary delivery server, the device comprising:
   a reprogrammable computing machine or a dedicated computing machine, able to and configured to:
   receive a request for proof of delegation, originating from the secondary delivery server and comprising a signature of the primary delivery server,
   and
   if the signature enables the content server to identify the primary delivery server, send a response comprising an encryption key associated with the content server.

* * * * *